US 7,010,518 B1

(12) United States Patent
Bedell et al.

(10) Patent No.: US 7,010,518 B1
(45) Date of Patent: Mar. 7, 2006

(54) SYSTEM AND METHOD FOR USER DEFINED DATA OBJECT HIERARCHY

(75) Inventors: Jeffrey A. Bedell, Arlington, VA (US); William Hurwood, Washington, DC (US); Benjamin Z. Li, Great Falls, VA (US); Fabrice Martin, Washington, DC (US); Sadanand Sahasrabudhe, McLean, VA (US); Jun Yuan, Sterling, VA (US)

(73) Assignee: MicroStrategy, Inc., McLean, VA (US)

( * ) Notice: Subject to any disclaimer, the term of this patent is extended or adjusted under 35 U.S.C. 154(b) by 872 days.

(21) Appl. No.: 09/884,476

(22) Filed: Jun. 20, 2001

(51) Int. Cl.
*G06F 17/30* (2006.01)

(52) U.S. Cl. .................. 707/3; 707/10; 707/103 R; 709/218; 709/219; 715/513

(58) Field of Classification Search .......... 707/1, 707/3, 5, 10, 103 R, 104.1; 715/513, 853; 704/8; 700/106; 709/217, 218, 201, 219; 706/11
See application file for complete search history.

(56) References Cited

U.S. PATENT DOCUMENTS

| | | |
|---|---|---|
| 4,688,195 A | 8/1987 | Thompson |
| 4,829,423 A | 5/1989 | Tennant |
| 5,197,005 A | 3/1993 | Shwartz |
| 5,276,870 A | 1/1994 | Shan |
| 5,418,943 A | 5/1995 | Borgida |
| 5,421,008 A | 5/1995 | Banning |
| 5,555,403 A | 9/1996 | Cambot |
| 5,584,024 A | 12/1996 | Shwartz |
| 5,664,182 A | 9/1997 | Nirenberg |
| 5,692,181 A | 11/1997 | Anand |
| 5,864,856 A | 1/1999 | Young |
| 5,914,878 A | 6/1999 | Yamamoto |
| 5,918,232 A | 6/1999 | Pouschine |
| 6,094,651 A | 7/2000 | Agrawal |
| 6,105,035 A * | 8/2000 | Monge et al. .......... 707/103 R |
| 6,154,766 A | 11/2000 | Yost |
| 6,247,008 B1 | 6/2001 | Cambot |
| 6,279,033 B1 | 8/2001 | Selvarajan |
| 6,424,968 B1 * | 7/2002 | Broster et al. ............... 707/3 |
| 6,581,068 B1 * | 6/2003 | Bensoussan et al. ..... 707/104.1 |
| 6,628,312 B1 * | 9/2003 | Rao et al. .................... 715/853 |

OTHER PUBLICATIONS

Gupta, Himanshu et al., "Index Selection for OLAP," IEEE 1063-6382, pp. 208-219.
Ho, Ching-Tien et al., "Partial-Sum Queries in OLAP Data Cubes Using Covering Codes," ACM 0-89791-910-6, pp. 228-237.

(Continued)

*Primary Examiner*—Shahid Alam
(74) *Attorney, Agent, or Firm*—Hunton & Williams LLP (57) ABSTRACT

The invention provides a configuration tool to allow a user to build a custom-selected data object hierarchy, for business intelligence or other purposes. Under conventional data storage technologies, the physical layout of the disk drive or other media has dictated what logical views and searches a user could run on the underlying data. For instance, levels could not be readily skipped or many-to-many data object relationships were difficult to maintain. In the invention, a user may select and connect a set of data objects into a hierarchy of their choosing, to permit desired reports and other manipulations on the data to be performed. The hierarchy may be edited, and entry points may be defined. Different levels of security may be applied to the different levels of the hierarchy. Multiple hierarchies or representations may be built for one database or other data source.

45 Claims, 5 Drawing Sheets

OTHER PUBLICATIONS

Robert C. Stern, Bruce M. Anderson and Craig W. Thompson, A Menu-Based Natural Language Interface To A Large Database, Texas Instruments Incorporated, P.O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional National Language Interfaces to Databases, Dissertation Presented to the Faculty of the Graduate School of The University of Texas at Austin, May 1984.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

GIS/LIS'88 Proceedings accessing the world, vol. 2 pp. 741-750.

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In Micro-Strategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

PRIOR ART

SYSTEM AND METHOD FOR USER DEFINED DATA OBJECT HIERARCHY

FIELD OF INVENTION

The invention relates to the field of data processing, and more particularly to a management tool to permit users of analytic engines and other information resources to custom structure a data schema for business intelligence and other purposes.

BACKGROUND OF THE INVENTION

The deployment of large scale databases and other information resources has led to an increase in both the power and scope of business analytic tools at the disposal of business managers, government or academic officials and others. The data assets used in such data mining applications may typically be configured in a relational database management system (RDMS), for instance an OLAP-driven platform.

The data for such data platforms may be stored on a large-scale redundant array of independent disks (RAID) platform, on storage area networks (SANs), on optical, electronic or other media. On such platforms, the physical storage characteristics may, in part, dictate the data object structure of the data stored therein.

Figure 3:
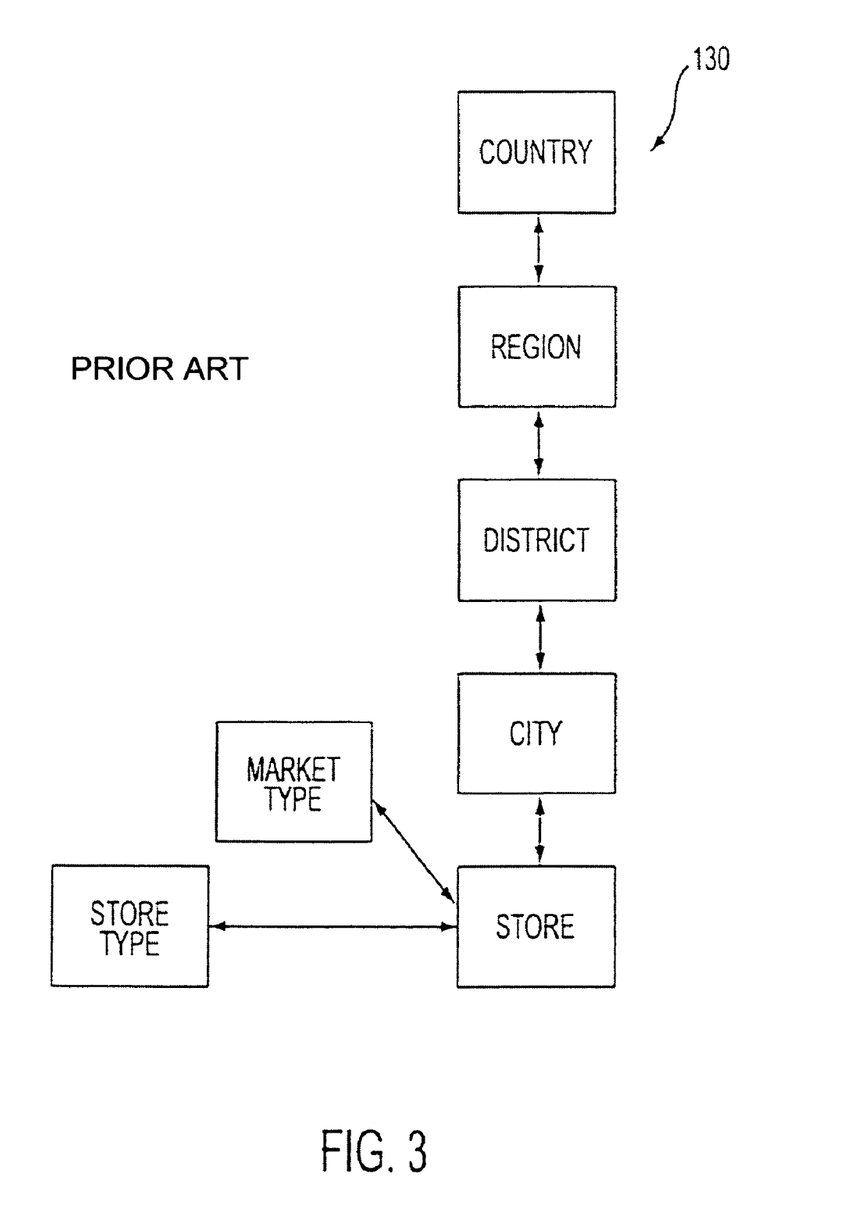
FIG. 3 is a block diagram illustrating a data object hierarchy according to a conventional data storage system.

For instance, as illustrated in FIG. 3, a data object hierarchy in a conventional system may include a set of geographically-oriented data objects, illustrated as country, region, district, city and store. In some data storage platforms, such as large scale disk arrays or others, this descending hierarchy may correspond to physical records on a disk or other media, such that country records are located next to sectors for, or link by pointers to, region records. Other data structures and linkages are possible. However, in such conventional data storage, the ability to view the data is limited by that underlying physical or logical storage structure.

Thus, a sales manager or other person wishing to browse country records and proceed to view city-level data may not be able to do so, directly. Instead, he or she may have to descend through the intermediate levels of the hierarchy. Or, a user wishing to associate or aggregate sales records for individual cities and then total them for a country-wide comparison may not be able to do so, or not do so very readily, since the schema is arranged in a rigid fashion which does not lend itself to flexible navigation.

This problem of fixed hierarchies is exacerbated even further when the data objects are arranged not in a one-to-one relationship, but in a one-to-many or many-to-many network. For instance, the field for stores illustrated in FIG. 3 may also point to a data object for both store type and market type. For instance, a large retailer may maintain separate automotive stores under the same brand, and the market for various stores may be divided, for instance, according to urban, suburban or other categories. Attempting to traverse these types of hierarchies to generate desired reports or other output may be difficult or impossible with existing technology. Other problems exist.

SUMMARY OF THE INVENTION

The invention overcoming these and other problems in the art relates in one regard to a system and method for a user defined data object hierarchy, which permits a user to associate data objects into a hierarchy of their choosing, not limited to the data structures of the underlying physical storage. According to the invention, a configuration engine may allow a user to build a custom-selected data object hierarchy of their choosing, for business intelligence or other purposes, for instance to generate desired reports or other manipulations on the data. Amongst the data objects populating the data object hierarchy, one or more entry points may be defined from which views or reports on the data may begin. The data object hierarchy may be edited, and different levels of security may be applied to different levels of the hierarchy.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
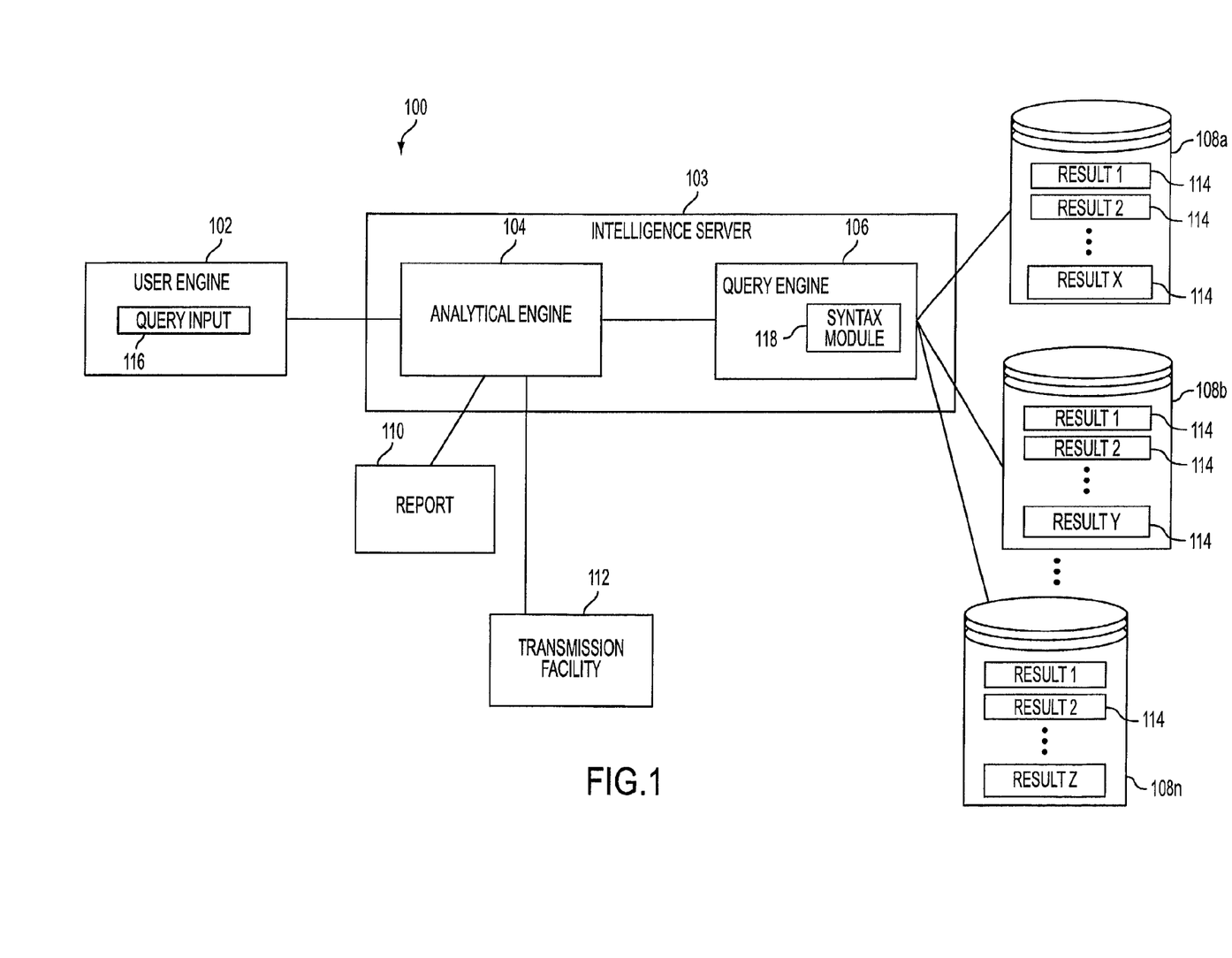
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b. . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1 M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
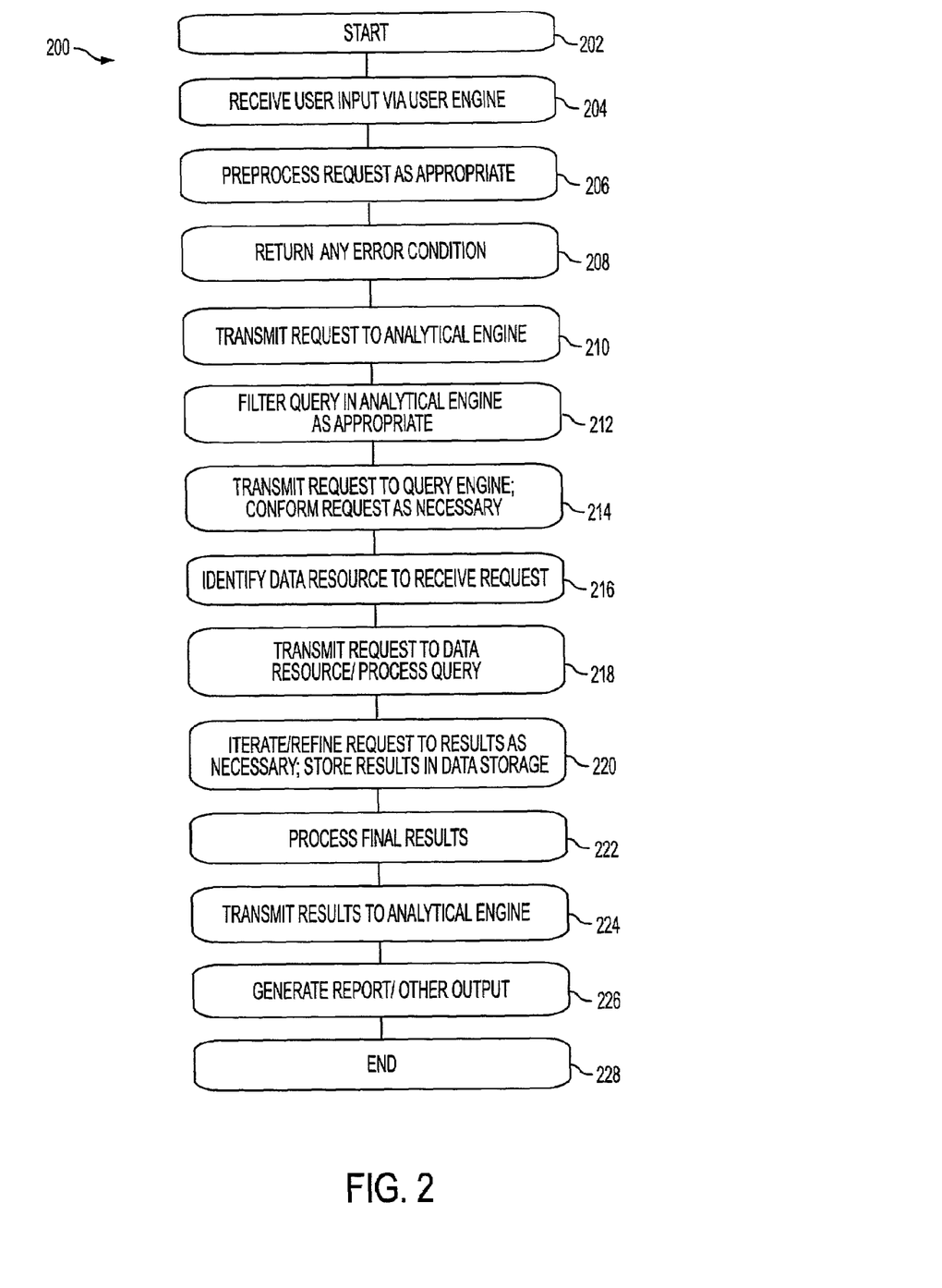
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 4:
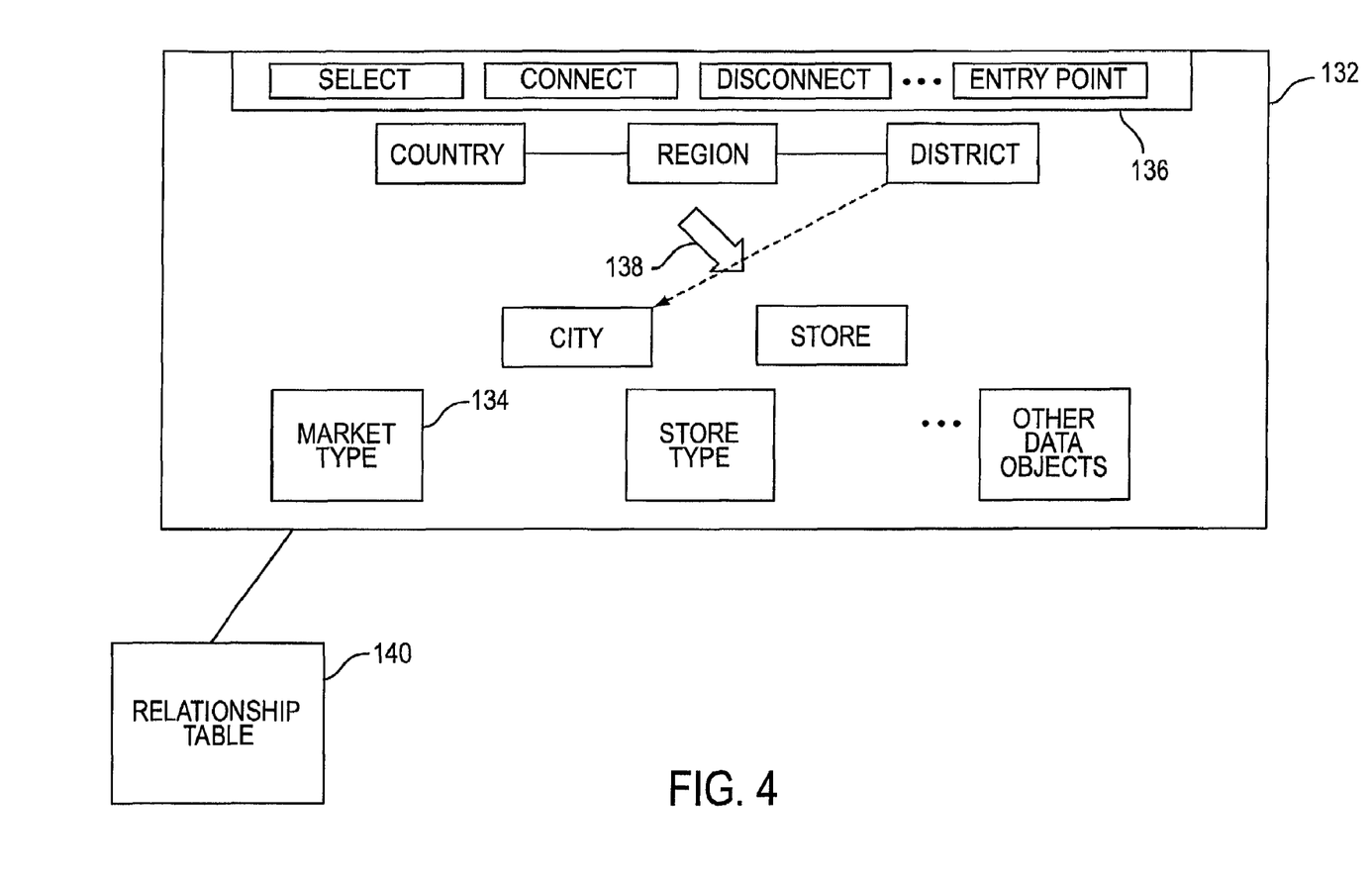
FIG. 4 is a block diagram illustrating a configuration engine for selecting custom data object hierarchies according to an embodiment of the invention.

In an embodiment of the invention illustrated in FIG. 4, a data configuration engine 132 may be presented to a user of the user engine 102, analytic engine 104 or other resource of a network according to the invention. In this embodiment, a user may be presented with a set of data configuration tools 136, such as a set of clickable or draggable icons or other graphical or other interface modules, to manipulate a set of data objects 134. The set of data objects 134 may include, for instance, graphical representations of stored data fields, records, keys or other data structures or objects, or information about such objects.

According to the invention, the user may select one or more data objects in the set of data objects 134 and select actions on those objects to create a data object hierarchy of their choosing. For instance, a user may select a "connect" action to draw a connection between a city data object and a district data object, as illustrated in FIG. 4. This may be done, for instance, by dragging a cursor 138 between the iconic representation of the two data objects, to create a connection. The connection may be one-directional or two-directional. The user may activate other actions on the set of data objects 134, for instance to disconnect an existing connection between data objects, or to select or highlight an object for further treatment.

In an embodiment of the invention, the graphically connected network of the set of data objects 134 may be reflected in a relationship table 140. The relationship table 140 may contain a mapping, or editable relationship, between the physical or default database representation of the data objects, and the user-defined hierarchy of the data objects. Other techniques for imaging or storing the data object hierarchy according to the invention may be used, such as the creation of a binary tree, linked list or other logical structure.

Figure 5:
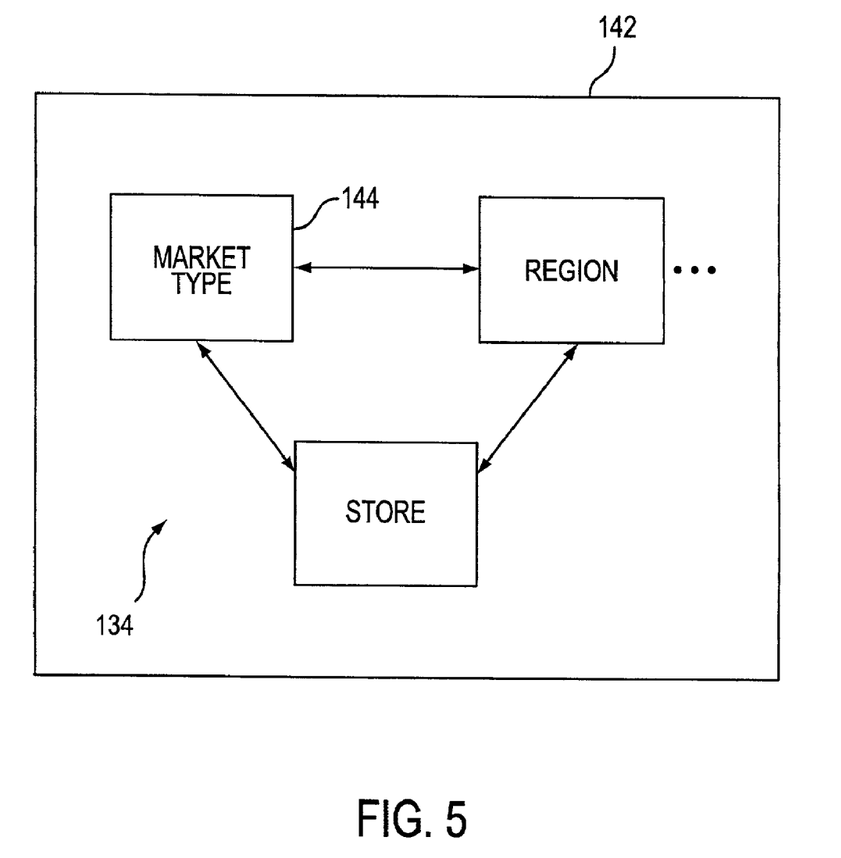
FIG. 5 is a block diagram illustrating a custom data object hierarchy which may be illustratively configured according to an embodiment of the invention.

The resulting network of data objects, with one or more of the objects each being traversable or navigable to one or more other data objects without constraint, results in a data hierarchy 142 such as illustratively shown in FIG. 5 as a network graph (i.e., connecting nodes together) and particularly as a directed network graph (i.e., showing directionality between nodes). In the illustrated hierarchy, the set of data objects 134 is now linked in a flexible manner according to user selection, here to link market type objects, region object and a store object in a ring. Each of the connections in the data hierarchy 142 may be followed, and each of the linked set of data objects 134 may be clicked into to gain a view of underlying data. Other data objects, connection topologies and relationships are possible, including for instance a three dimensional linkage. However, according to the invention the data hierarchy 142 may be used to obtain views into the data, run reports, searches and otherwise manipulate the information content, without being constrained by the physical layout of the underlying media storing the data.

In another regard, as shown in FIG. 5, according to the invention one or more of the set of data objects 134 may be selected as an entry point 144. The entry point 144, here illustrated as a market type data object, may represent a node or nodes from which views on the data may be obtained or searches or reports run. However, the selection and configuration of one or more of entry point 144 is arbitrary and extensible, using the data configuration engine 132. A user may thus be presented data and reports from records of interest, in an order and in a hierarchy that is functionally useful, rather than physically required by storage hardware or software by itself. In embodiments of the invention, data objects other than those designated as an entry point 144 may only be accessed after gaining entry into the hierarchy 142 via an entry point 144.

In another aspect, different levels or types of security may be applied to different one or more of the data objects within the set of data objects 134, for instance to restrict access to different groups of authorized users, or otherwise. Certain data objects, or fields or attributes of those data objects, may be locked from view. Similarly, the number of data objects or attributes that may be accessed and viewed by a given user may be limited, depending on authorization levels or other factors.

In another regard, because the data configuration engine 132 operates to define the hierarchy 142 on a logical rather than physical basis, in embodiments of the invention more than one hierarchy 142 may be defined on the same underlying data or using the same underlying database or other storage medium. Each such hierarchy 142 in such a set of hierarchies may have its own independent set of associated connections, entry points, security attributes and other features.

The foregoing description of the invention is illustrative, and variations in configuration and implementation will occur to persons skilled in the art. For instance, while the data configuration engine 132 has been illustrated as operating on one set of primitive data objects, other types of objects, such as condition objects, programming objects such as functions, or nested objects can also be managed using the invention. Similarly, while the invention has generally been illustrated in terms of single connections between data objects, one or more data objects may be multiply connected to one or more other data objects. The scope of the invention is accordingly to be limited only by the following claims.

The invention claimed is:

1. A computer system for configuring a representation of data objects in a reporting system, comprising:
   a set of at least two data objects; and
   a selection tool, communicating with the set of at least two data objects, the selection tool being operable to select at least two of the at least two data objects to define an editable relationship between the at least two data objects in the reporting system; and
   wherein the relationship defines a direction of one object to another and the direction of the object with respect to the other object differs from the directional relationship of those objects in the database where those data objects reside.

2. The computer system of claim 1, wherein the relationship comprises a network graph.

3. The computer system of claim 2, wherein the network graph comprises a directed graph.

4. The computer system of claim 3, wherein the selection tool is operable to designate at least one of the set of at least two data objects as an entry point.

5. The computer system of claim 2, wherein the network graph is traversable.

6. The computer system of claim 1, wherein the editable relationship establishes relationships between at least one object that is not related to the database where other data objects reside.

7. The computer system of claim 6, wherein the at least one object not related to the database is derived from an object in the database.

8. The computer system of claim 7, further comprising a request engine, the request engine translating requests based on the relationship into requests for access to the at least one database.

9. The computer system of claim 8, wherein the requests generate results from the at least one database, and the request engine presents the results in the representation.

10. The computer system of claim 1, wherein the editable relationship may skip objects that otherwise exist in the relationship of objects in the database.

11. The computer system of claim 1, wherein the set of at least two data objects corresponds to data stored in at least one data source.

12. The computer system of claim 11, wherein the at least one data source comprises at least one database.

13. The computer system of claim 11 wherein a plurality of representations may be generated from the at least one data source.

14. The computer system of claim 1, wherein the selection tool comprises a graphical user interface.

15. The computer system of claim 1, wherein the set of at least two data objects is associated with an OLAP-compliant database.

16. The computer system of claim 1, wherein the relationship is extensible.

17. The computer system of claim 1, further comprising at least one of a relationship table, a binary tree and a linked list, storing a representation of the relationship.

18. The computer system of claim 1, wherein at least one of the at least two data objects comprises an associated security attribute.

19. The computer system of claim 18, wherein the associated security attribute restricts access to the at least one data object according to predetermined criteria.

20. A computer system for configuring a representation of data objects in a reporting system, comprising:
    a set of at least two data objects; and
    a selection tool, communicating with the set of at least two data objects, the selection tool being operable to select at least two of the at least two data objects to define an editable relationship between the at least two data objects in the reporting system, wherein the relationship defines an ordering of one object with respect to another and the ordering in the editable relationship differs from the ordering of the two objects in the database where those data objects reside.

21. A computer-implemented method for configuring a representation of data objects in a reporting system, comprising:
    a) accessing a set of at least two data objects; and
    b) enabling a user to perform the act of selecting at least two of the set of at least two data objects to define an editable relationship between the at least two data objects in the reporting system;
    wherein the relationship defines a direction of one object to another and the direction of the object with respect to the other object differs from the directional relationship of those objects in the database where those data objects reside.

22. The computer-implemented method of claim 21, wherein the relationship comprises a network graph.

23. The computer-implemented method of claim 22, wherein the network graph comprises a directed graph.

24. The computer-implemented method of claim 22, wherein the network graph is traversable.

25. The computer-implemented method of claim 21, further comprising a step of c) designating at least one of the set of at least two data objects as an entry point.

26. The computer-implemented method of claim 21, wherein the set of at least two data objects corresponds to data stored in at least one data source.

27. The computer-implemented method of claim 26, wherein the at least one data source comprises at least one database.

28. The computer-implemented method of claim 26, further comprising a step of d) translating requests based on the relationship into requests for access to the at least one database.

29. The computer-implemented method of claim 28, further comprising a step of e) generating results from the at least one database based on the requests, and f) presenting the results in the representation.

30. The computer-implemented method of claim 26, further comprising a step of h) generating a plurality of representations based on the at least one data source.

31. The computer-implemented method of claim 21, wherein the editable relationship establishes relationships between at least one object that is not related to the database where other data objects reside.

32. The computer-implemented method of claim 31, wherein the at least one object not related to the database is derived from an object in the database.

33. The computer-implemented method of claim 21, wherein the editable relationship may skip objects that otherwise exist in the relationship of objects in the database.

34. The computer-implemented method of claim 21, wherein the selection tool comprises a graphical user interface.

35. The computer-implemented method of claim 21, wherein the set of at least two data objects is associated with an OLAP-compliant database.

36. The computer-implemented method of claim 21, wherein the relationship is extensible.

37. The computer-implemented method of claim 21, further comprising a step of f) storing the representation of the relationship in at least one of a relationship table, a binary tree and a linked list.

38. The computer-implemented method of claim 21, wherein at least one of the at least two data objects comprises an associated security attribute.

39. The computer-implemented method of claim 38, further comprising a step of g) restricting access to the at least one data object based on the security attribute according to predetermined criteria.

40. A computer-implemented method for configuring a representation of data objects in a reporting system, comprising:

a) accessing a set of at least two data objects; and b) enabling a user to perform the act of selecting at least two of the set of at least two data objects to define an editable relationship between the at least two data objects in the reporting system, wherein the relationship defines an ordering of one object with respect to another and the ordering in the editable relationship differs from the ordering of the two objects in the database where those data objects reside.

41. A machine readable medium, the machine readable medium being readable to execute a method for configuring a representation of data objects in a reporting system, the machine readable medium comprising:

a) code for causing a computer-based machine to perform the act of accessing a set of at least two data objects; and b) code for causing a computer-based machine to perform the act of enabling a user to perform the act of selecting at least two of the set of at least two data objects to define an editable relationship between the at least two data objects in the reporting system; wherein the relationship defines a direction of one object to another and the direction of the object with respect to the other object differs from the directional relationship of those objects in the database where those data objects reside.

42. The medium of claim 41, wherein the set of at least two data objects corresponds to data stored in at least one data source.

43. The medium of claim 42, wherein the at least one data source comprises at least one database.

44. The medium of claim 43, further comprising code for causing a computer-based machine to perform the act of c) translating requests based on the relationship into requests for access to the at least one database.

45. A machine readable medium, the machine readable medium being readable to execute a method for configuring a representation of data objects in a reporting system, the machine readable medium comprising:

code for causing a computer-based machine to perform the act of accessing a set of at least two data objects;

code for causing a computer-based machine to perform the act of enabling a user to perform the act of selecting at least two of the set of at least two data objects to define an editable relationship between the at least two data objects in the reporting system; and wherein the relationship defines an ordering of one object with respect to another and the ordering in the editable relationship differs from the ordering of the two objects in the database where those data objects reside.

* * * * *